United States Patent [19]

Vasta

[11] Patent Number: 4,578,286
[45] Date of Patent: * Mar. 25, 1986

[54] ELECTRICALLY CONDUCTIVE COATING COMPOSITION OF A CHLOROSULFONATED POLYETHYLENE

[75] Inventor: Joseph A. Vasta, Wilmington, Del.

[73] Assignee: E. I. Du Pont de Nemours and Company, Wilmington, Del.

[*] Notice: The portion of the term of this patent subsequent to Apr. 23, 2002 has been disclaimed.

[21] Appl. No.: 687,363

[22] Filed: Dec. 28, 1984

Related U.S. Application Data

[63] Continuation-in-part of Ser. No. 578,031, Feb. 2, 1984, Pat. No. 4,513,060.

[51] Int. Cl.⁴ .................. B32B 5/00; H01B 1/06
[52] U.S. Cl. ..................... 427/327; 252/511; 427/386; 427/388.1; 428/413
[58] Field of Search ............. 252/511; 427/327, 386, 427/388.1; 428/413

[56] References Cited

U.S. PATENT DOCUMENTS

| | | | |
|---|---|---|---|
| 3,026,294 | 3/1962 | Liberman | 260/45.5 |
| 3,518,116 | 6/1970 | Stock et al. | 252/511 |
| 3,600,469 | 3/1971 | Sato et al. | 525/120 |
| 3,891,606 | 6/1975 | Kogan | 528/57 |
| 3,899,438 | 8/1975 | Kalil | 528/71 |
| 4,127,699 | 11/1978 | Aumiller et al. | 252/511 |
| 4,424,353 | 1/1984 | Meyer et al. | 528/94 |
| 4,513,060 | 4/1985 | Vasta | 428/416 |

FOREIGN PATENT DOCUMENTS

| | | |
|---|---|---|
| 410370 | 2/1971 | Australia . |
| 2152237 | 10/1972 | Fed. Rep. of Germany . |
| 1301717 | 7/1962 | France . |
| 785607 | 12/1972 | France . |
| 1268154 | 3/1972 | United Kingdom . |
| 2112338 | 7/1983 | United Kingdom . |

OTHER PUBLICATIONS

Encyclopedia of Chemical Technology 3rd Edition, 1979, Kirkothmer vol. 3, pp. 640–663.
Fluorad ® Coating Additives; Technical Bulletin—Commercial Chemicals Division; 3M Company.
Chlorosulfonated Polyethylene—A New Binder for use in Paints; 1958 Kelly et al.; Reprint—Federation of Paint & Varnish Prd. Clubs Digest.
Coatings of Hypalon ® 20 Synthetic Rubber; Roche; Elastomers Div., Du Pont Co., 1956.

*Primary Examiner*—Lewis T. Jacobs
*Attorney, Agent, or Firm*—Hilmar L. Fricke

[57] ABSTRACT

A coating composition containing 10–80% by weight of binder and 20–90% by weight of an organic solvent in which the binder is
(1) a chlorosulfonated polyethylene,
(2) an epoxy resin,
(3) a polyamine curing agent, and optionally
(4) a bicyclic amidine or a strong organic base.

The composition contains electrically conductive pigments such as carbon black and graphite to provide an electrically conductive film. The composition is used on grids of lead acid storage batteries to prolong the life of the battery or to reduce size and weight of the battery while maintaining power output of the battery.

24 Claims, No Drawings

ELECTRICALLY CONDUCTIVE COATING COMPOSITION OF A CHLOROSULFONATED POLYETHYLENE

CROSS REFERENCE TO RELATED APPLICATIONS

This application is a continuation-in-part of Ser. No. 578,031 filed Feb. 2, 1984, now U.S. Pat. No. 4,513,060.

BACKGROUND OF THE INVENTION

This invention is related to a coating composition and in particular to an electrically conductive chlorosulfonated polyethylene coating composition.

Chlorosulfonated ethylene polymers are inert to strong acids and are tough and abrasion resistant. Coatings of these polymers are extremely useful for protecting metal substrates exposed to chemicals such as strong acid and make such coatings particularly useful for protecting the grids of lead acid storage batteries.

The life of conventional lead-acid storage batteries can be increased, the power output of these batteries can be increased without an increase in battery size or the size of the battery can be decreased without a decrease in power output by coating the lead grids used to make the electrodes of the batteries. The coating must adhere to the lead grid, be impervious to the sulfuric acid used in the battery, be electrically conductuve and have a low electrical resistance.

Conventional coatings do not have the aforementioned characteristics. The unique coating composition of this invention is designed for coating lead grids used in lead acid storage batteries.

SUMMARY OF THE INVENTION

A coating composition containing 10–80% by weight of binder and 20–90% by weight of an organic solvent; wherein the binder is a mixture of
(1) chlorosulfonated polyethylene having a weight average molecular weight of about 75,000 to 300,000 determined by gel permeation chromatography and having a chlorine content of 20 to 50% by weight and a sulfur content of 0.7 to 2.0% by weight;
(2) an epoxy resin;
(3) a polyamine curing agent selected from the following:

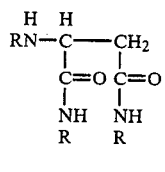

or

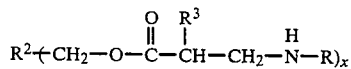

where R is $R^1NH_2$ and $R^1$ is an aliphatic or cycloaliphatic hydrocarbon radical, $R^2$ is C or a hydrocarbon group, $R^3$ is H or $CH_3$; when x is 3 $R^2$ is a hydrocarbon group and when x is 4 $R^2$ is C;
wherein the coating composition contains electrically conductive pigments in a pigment to binder weight ratio of about 50/100 to 300/100 and a dry film of the coating composition 25 microns thick has an electrical resistance of about 1–50 ohms.

DETAILED DESCRIPTION OF THE INVENTION

The coating composition contains about 10–80% by weight binder and about 20–90% by weight organic solvent. The binder is a blend of a chlorosulfonated polyethylene, an epoxy resin, a polyamine curing agent and preferably a bicyclic amine. When the composition contains the bicyclic amidine, one of the advantages of the composition is that it cures rapidly at ambient temperatures and baking is not required.

Without the bicyclic amidine, the composition can be cured by baking at elevated temperatures of about 40°–70° C. for about 15 minutes to 3 hours.

To be an effective coating for the grids of electric storage batteries, the composition must be electrically conductive and have a low resistance. The composition contains conductive pigments such as carbon black, graphite and the like in a pigment to binder weight ratio of about 50/100 to 300/100 to provide an electrically conductive film. A 25 micron thick film of the composition in its dried state has an electrical resistance of about 1–50 ohms and preferably 5–20 ohms.

Typical conductive pigments that can be used are carbon black pigments such as furnace black and acetylene black and graphite. One preferred carbon black is Gulf acetylene black. Preferably, a mixture of carbon black pigments and finely divided graphite are used. Transition metal oxides also are useful conductive pigments such as lead oxide, magnetite, titanium suboxide having the formula TiOx where x is less than 2, ruthenium oxide, mixtures of ruthenium oxide and titanium suboxide and the like.

The chlorosulfonated polyethylene is a partially chlorinated polyethylene containing sulfonyl chloride groups and has the formula

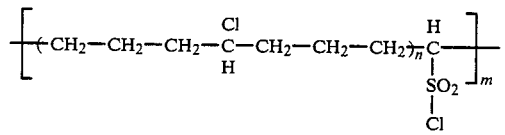

where m and n are positive integers of about 5–25. The polymer has a weight average molecular weight of about 75,000 to 300,000 and preferably, about 100,000 to 150,000 to form a high quality composition. Polymers in the lower end of the molecular weight range are preferred for forming a composition with higher binder content.

Molecular weight, as used herein, is determined by gel permeation chromatography using polymethyl methacrylate as a standard.

The chlorosulfonated polyethylene has a chlorine content of about 20–50% by weight and preferably about 29–43% by weight and a sulfur content of about 0.7 to 2.0% by weight and preferably about 1.1–1.5% by weight.

An epoxy resin that can be used in the composition has the formula

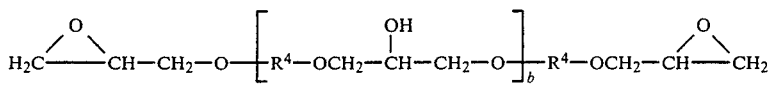

where b is a positive integer of about 0.5 to 4. Preferably, the epoxy resin is the polymerization product of epichlorohydrin and bisphenol A. In a preferred epoxy resin, R⁴ in the above formula is

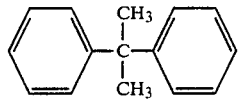

Typical of these preferred epoxy resins are "Epon" 828 having an equivalent weight of about 185–192 manufactured by Shell Chemical Company and DER 331 having an equivalent weight of about 182–190 manufactured by The Dow Chemical Company. The equivalent weight is the grams of resin that contain one gram equivalent of epoxide.

An epoxy novolac resin that can be used in the composition has the formula

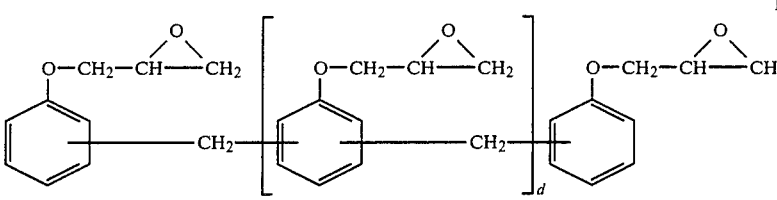

where d is a positive integer of about 0.2–2. Preferred epoxy novolac resins are DEN 431 where d has an average value of 0.2, DEN 438 where d has an average value of 1.6 and DEN 439 where d has an average value of 1.8. These resins are manufactured by the Dow Chemical Company.

The coating composition contains a polyamine curing agent of the formula

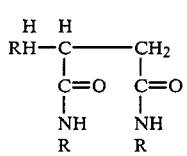

where R is R¹NH₂ and R¹ is an aliphatic or cycloaliphatic hydrocarbon radical. The aliphatic hydrocarbon radical can have 2–9 carbon atoms and the cycloaliphatic hydrocarbon radical can have 6–10 carbon atoms.

The curing agent is prepared by reacting 3 moles of an aliphatic or cycloaliphatic polyamine with 1 mole of a dialkyl maleate. Reaction temperatures of about 100°–150° C. are used for about 1–6 hours to form the curing agent while an alkanol resulting from the reaction is removed.

Typical polyamines used to form the curing agent are isophorone diamine which is 3-aminoethyl-3,5,5-trimethyl cyclohexylamine, hexamethylene diamine, ethylene diamine, 1,4-clclohexane bis(methylamine), 1,2-diaminopropane, propylene diamine, diethyl ether diamine and trimethyl hexamethyl methylene diamine. Typical dialkyl maleates are dimethyl maleate, diethyl maleate, ethyl methyl maleate, dipropyl maleate, dibutyl maleate and the like.

One preferred curing agent is the reaction product of isophorone diamine and dimethyl maleate and has the following structural formula A polyamine curing agent of the following formula can be used also:

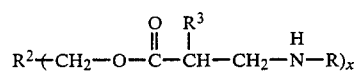

where R is defined above, R² is C or a hydrocarbon group, R³ is H or CH₃; where x is 3 when R² is a hydrocarbon group and x is 4 when R² is C.

This ester curing agent is prepared through a Michael's reaction in which a multifunctional acrylate or methacrylate is reacted with a polyamine. In the preparation of the curing agent the polyamine is heated to about 100°–150° C. and then reacted with the polyamine for about a 1–6 hour period to form an amine terminated curing agent.

Typical multifunctional acrylates or methacrylates that can be used to form the curing agent are trimethylol propane acrylate, trimethylol propane methacrylate, trimethylol butane methacrylate or acrylate, pentaerythritol acrylate, pentaerythritol methacrylate and the like. Typically, R² is either C or a hydrocarbon group having 2–4 carbon atoms.

The above polyamines are used to form this curing agent. Isophorone diamine is preferred.

Preferred polyamine curing agents are the reaction product of the following isophorone diamine and trimethylol propane acrylate; isophorone diamine and pentaerythritol acrylate; hexamethylene diamine and trimethylol propane acrylate; and hexamethylene diamine and pentaerythritol acrylate.

The binder of the coating composition contains about 35-90% by weight of the chlorosulfonated polyethylene, 7-60% by weight of epoxy resin, and 3-20% by weight of the polyamine curing agent.

To form an ambient temperature curing composition about 0.1-3% by weight based on the weight of the binder, of a bicyclic amidine is used in the composition. The bicyclic amidine also significantly extends the "pot life" of the composition after all of the constituents of the composition are mixed together. Preferably, about 0.2-3% by weight, based on the weight of the binder, of the bicyclic amidine is used. One preferred bicyclic amidine is 1,8-diaza-bicyclo-(5,4,0)-undecene-7.

About 1 to 4% by weight, based on the weight of the binder, of phenol can be added to the composition to decrease curing time and enhance toughness of the resulting finish.

Preferably, the binder of an ambient temperature curing composition contains 40-85% by weight of the chlorosulfonated polyethylene, 9-44% by weight of epoxy resin, 3-20% by weight of the polyamine curing agent, and 0.1-3% by weight of bicyclic amidine.

In the place of the bicyclic amidine, about 0.1-3% by weight, based on the weight of the binder, of a strong organic base can be used. Typically useful bases are tertiary alkyl ammonium hydroxide such as tertiary ethyl, propyl or butyl ammonium hydroxide, tertiary alkyl ammonium methoxide such as tertiary ethyl, propyl or butyl ammonium methoxide.

Instead of the polyamine curing agent, a lead compound such as litharge or other lead oxides or lead dioxides or lead salts such as lead naphthenate, lead decanoate and tribasic lead maleate can be used. However, the resulting coating preferably is baked at about 40°-70° C. for about 15 minutes-2 hours. The lead compound is used in about the same amounts in the coating composition as is the polyamine curing agent.

Preferably, solvents used in the composition are chosen to provide curing at ambient temperatures and have a high evaporation rate at these temperatures. Typically useful solvents are as follows: alcohols such as methanol, ethanol, propanol, isopropanol, benzyl alcohol, acetates such as ethyl acetate and other solvent such as toluene, xylene, and the like.

The coating composition can be applied by conventional methods such as spraying, electrostatic spraying, brushing, dipping, flow coating and the like. The coating can be baked at temperatures of about 40°-70° C. for about 15 minues to 3 hours to form a coating about 10-200 microns thick. If the bicyclic amidine is used in the composition, the composition cures at ambient temperatures.

Typically, the grids of lead acid storage batteries are made from antimony lead alloys or calcium lead alloys. Preferably, a thin coating an amino silane is applied first. Typically useful amino silanes are gamma amino propyl trimethoxy silane, gamma glycidoxy trimethoxy silane, N-(2-aminoethyl)-3-amino-propyl trimethoxysilane and 3[2(vinylbenzyl amino)ethyl amino]propyl trimethoxy silane. Then a coating of a composition of this invention is applied to the grid by spray application and then baked at 125°-175° C. Generally, the resulting coating is about 20-50 microns thick and has excellent conductivity.

Batteries made from such coated grids have a life of about 2-3 times that of batteries made with uncoated grids. Alternatively, thinner grids can be used which reduce battery size by about one half to one third without decreasing the life of the battery in comparison to a battery made with uncoated grids. By maintaining the size and weight of the battery to that of a conventional battery but using thinner coated grids, the power output of the battery can be increased 2-3 times in comparison to a conventional battery made with uncoated grids.

The following example illustrates the invention. All parts and percentages are on a weight basis unless otherwise indicated. Molecular weights are determined by gel permeation chromatography using polymethyl methacrylate as a standard.

EXAMPLE 1

The following constituents were blended together and charged into a ball mill and ground until a uniform pigment dispersion was formed:

|  | Parts By Weight |
|---|---|
| Chlorosulfonated polyethylene solution (25% solids in toluene solvent of a chlorosulfonated polyethylene having a weight average molecular weight of about 115,000 determined by gel permeation chromatography and contains about 43% chlorine and about 1.4% sulfur) | 98.7 |
| Toluene | 296.0 |
| D.E.R. 331 epoxy resin (liquid epoxy resin of bisphenol A and epichlorohydrin having an epoxide equivalent weight of about 182-190 and a viscosity measured at 25° C. of 11,000-14,000 cps) | 42.4 |
| Carbon black pigment (Gulf acetylene black) | 37.2 |
| Graphite 200-9 (finely divided graphite) | 111.7 |
| Ethyl acetate | 82.8 |
| Toluene | 331.2 |
| Total | 1000.0 |
| Composition A was prepared by blending together the following constituents: | |
| Polyamine curing agent solution (55% solids in isopropanol of the reaction product of 3 moles of isophorone diamine and dimethyl maleate) | 13.26 |
| Bicyclic amidine [1,8-diaza-bicyclo(5,4,0) undecene-7] | 3.06 |
| Toluene/ethyl acetate (50/50 blend) | 172.00 |
| Total | 188.32 |

Composition A was thoroughly blended with 300 parts of the pigment dispersion prepared above and reduced with toluene/ethyl acetate to a spray viscosity of about 25 seconds measured with a No. 2 Zahn cup to form a paint. The paint was sprayed onto a glass panel to a 25 micron dry film thickness and the electrical resistance was measured and was about 5-7 ohms.

A calcium alloy lead grid and an antimony alloy lead grid used in storage batteries were first coated with a 2% solution of gamma amino propyl trimethoxy silane and dried and then sprayed with the above paint and baked at about 65° C. for about 1 hour. The resulting film was about 40 microns thick and had excellent adhesion to the lead substrate.

The coated lead grids were immersed in sulfuric acid solution and held at a 2.3 volt potential for 4 weeks. The coating did not blister or deteriorate and no corrosion of the substrate was noted. In comparison, uncoated lead grids exposed under the same conditions corroded severely.

Lead acid storage batteries made with the coated lead grids are expected to have a life of about 2-3 times that of batteries made with uncoated lead grids. Lead acid storage batteries can be made with grids that are ⅓-½ of the weight of conventional uncoated grids and can be expected to have a life equivalent to that of a conventional battery. Also, lead acid storage batteries can be made of the same size as conventional batteries but with substantially more power since the grids can be made thinner and more grids can be used in the battery; hence, increasing power of the battery.

I claim:

1. A coating composition comprising 10-80% by weight of binder and 20-90% by weight of an organic solvent; wherein the binder consists essentially of about (1) 35-90% by weight, based on the weight of the binder, of a chlorosulfonated polyethylene having a weight average molecular weight of about 75,000 to 300,000 determined by gel permeation chromatography and having a chlorine content of 20 to 50% by weight and a sulfur content of 0.7 to 2.0% by weight;

(2) 7-60% by weight, based on the weight of the binder, of an epoxy resin;

(3) 3-20% by weight, based on the weight of the binder, of a polyamine curing agent selected from the group consisting of

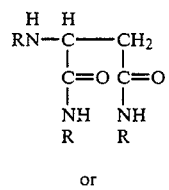

or

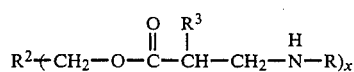

where R is $R_1NH_2$ and $R^1$ is an aliphatic or cycloaliphatic radical; $R^2$ is C or a hydrocarbon group, $R^3$ is H or $CH_3$, when x is 3 $R^2$ is a hydrocarbon group and when x is 4 $R^2$ is C;

wherein the coating composition contains electrically conductive pigments in a pigment to binder weight ratio of about 50/100 to 300/100 and a dry film of the coating composition 25 microns thick has an electrical resistance of about 1-50 ohms.

2. The coating composition of claim 1 in which the electrically conductive pigments are a mixture of carbon black pigment and finely divided graphite.

3. The coating composition of claim 2 in which the chlorosulfonated polyethylene has the formula

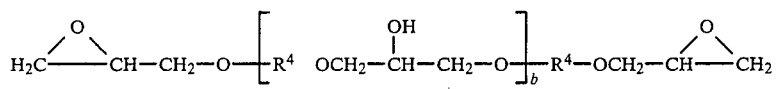

where m and n are positive integers of about 5-25 and has a weight average molecular weight of about 100,000 to 150,000.

4. The coating composition of claim 3 in which the epoxy resin has the formula

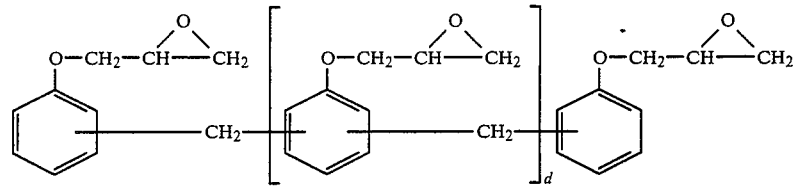

where $R^4$ is an aromatic radical and b is a positive integer of about 0.5 to 4.

5. The coating composition of claim 4 in which $R^4$ is

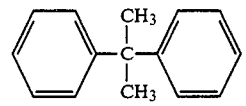

6. The coating composition of claim 3 in which the epoxy resin is an epoxy novolac resin of the formula

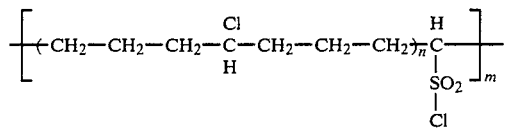

where d is a positive integer of about 0.2-2.

7. The coating composition of claim 5 in which the polyamine curing agent is

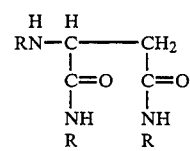

where R is $R^1NH_2$ and $R^1$ is an aliphatic or cycloaliphatic radical.

8. The coating composition of claim 7 in which R is

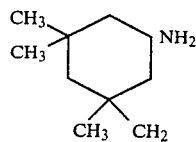

9. The coating composition of claim 3 containing about 0.1-3% by weight, based on the weight of the binder, of a bicyclic amidine.

10. The coating composition of claim 9 in which the bicyclic amidine is 1,8-diaza-bicyclo-(5,4,0)undecene-7.

11. The coating composition of claim 3 containing about 0.1-3% by weight, based on the weight of the binder of a strong organic base.

12. The coating composition of claim 11 in which the strong organic base is a tertiary alkyl ammonium hydroxide or a tertiary alkyl ammonium methoxide.

13. The coating composition of claim 1 in which the binder consists essentially of about
(1) 40-85% by weight, based on the weight of the binder, of a chlorosulfonated polyethylene having the formula

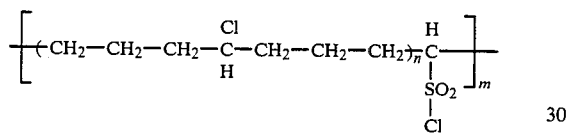

where m and n are positive integers of about 5-25 and has a weight average molecular weight of about 100,000 to 150,000;
(2) 9-44% by weight, based on the weight of the binder, of an epoxy resin of the formula

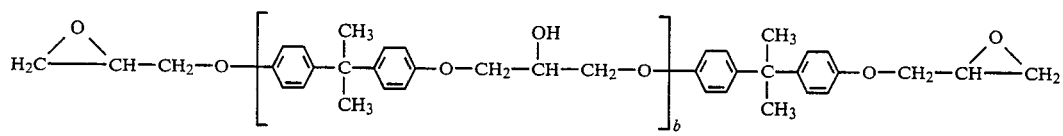

where b is a positive integer of about 0.5 to 4;
(3) 3-20% by weight, based on the weight of the binder, of a polyamine curing agent of the formula

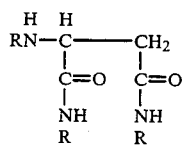

where R is

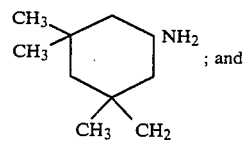

(4) 0.1-3% by weight of 1,8-diaza-bicyclo(5,4,0)-undecene-7 and
wherein the electrically conductive pigments comprise a mixture of carbon black pigment and finely divided graphite and a dry film of the coating has an electrical resistance of 5-20 ohms.

14. A coating composition comprising 10-80% by weight of binder and 20-90% by weight of an organic solvent; wherein the binder consists essentially of about
(1) 35-90% by weight, based on the weight of the binder, of chlorosulfonated polyethylene having a weight average molecular weight of about 75,000 to 300,000 determined by gel permeation chromatography and having a chlorine content of 20 to 50% by weight and a sulfur content of 0.7 to 2.0% by weight;
(2) 7-60% by weight, based on the weight of the binder, of an epoxy resin;
(3) 3-20% by weight, based on the weight of the binder, of a polyamine curing agent selected from the group consisting of

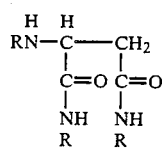

or

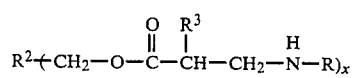

where R is $R^1NH_2$ and $R^1$ is an aliphatic or cycloaliphatic radical, $R^2$ is C or a hydrocarbon group, $R^3$ is H or $CH_3$ when x is 3, $R^2$ is a hydrocarbon group and when x is r $R^2$ is C.

15. The coating composition of claim 14 in which the polyamine curing agent is

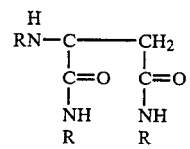

16. The coating composition of claim 15 in which R is

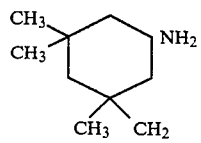

17. The coating composition of claim 14 containing about 0.1-3% by weight, based on the weight of the binder, of a strong organic base.

18. The coating composition of claim 17 in which the strong organic base is a teriary alkyl ammonium hydroxide or a tertiary alkyl ammonium methoxide.

19. A coating composition comprising 10-80% by weight of binder and 20-90% by weight of an organic solvent; wherein the binder consists essentially of about
   (1) 35-90% by weight, based on the weight of the binder, of a chlorosulfonated polyethylene having a weight average molecular weight of about 75,000 to 300,000 determined by gel permeation chromatography and having a chlorine content of 20 to 50% by weight and a sulfur content of 0.7 to 2.0% by weight;
   (2) 7-60% by weight, based on the weight of the binder, of an epoxy resin;
   (3) 3-20% by weight, based on the weight of the binder, of a lead compound curing agent;
wherein the coating composition contains electrically conductive pigments in a pigment to binder weight ratio of about 50/100 to 300/100 and a dry film of the coating composition 25 microns thick has an electrical resistance of about 1-50 ohms.

20. The coating composition of claim 19 in which the lead compound curing agent is lead oxide.

21. A process for coating lead alloy grids used lead-acid electric storage batteries which comprises
   (1) applying a thin coating of an amino silane to the grid and
   (2) applying a coating of the composition of claim 1 and drying the composition to provide a film about 10-200 microns thick.

22. The process of claim 21 in which the lead alloy grid is of an antimony lead alloy or a calcium lead alloy.

23. The process of claim 22 in which the amino silane is gamma aminopropyl trimethoxy silane.

24. A lead alloy battery grid having a coating of the composition of claim 1.

* * * * *